United States Patent [19]

Nakamura et al.

[11] 4,064,808
[45] Dec. 27, 1977

[54] ARMATURE RAILS AND RAIL CARRYING ARRANGEMENT FOR ATTRACTION TYPE MAGNETICALLY FLOATED TRAVELLING BODY

[75] Inventors: Shinji Nakamura, Kawasaki; Kiyoshi Mihirogi, Odawara, both of Japan

[73] Assignee: Japan Air Lines Co., Ltd., Tokyo, Japan

[21] Appl. No.: 785,296

[22] Filed: Apr. 6, 1977

[30] Foreign Application Priority Data

Mar. 8, 1977 Japan .................................. 52-25285

[51] Int. Cl.² ............................................ B61B 13/08
[52] U.S. Cl. ............................................ 104/148 MS
[58] Field of Search ................. 104/148 LM, 148 MS, 104/148 SS; 248/228, 316 E; 403/362, 364, 188; 52/588, 73, 487; 238/122; 335/219; 310/12, 13

[56] References Cited

U.S. PATENT DOCUMENTS

| 1,212,262 | 1/1917 | Rockwell | 403/364 |
| 2,993,714 | 7/1961 | Junghanns | 403/362 |
| 3,333,799 | 8/1967 | Peterson | 248/228 |
| 3,590,545 | 7/1971 | Webb | 52/588 |
| 3,937,149 | 2/1976 | Winkle et al. | 104/148 MS |

FOREIGN PATENT DOCUMENTS

| 2,152,393 | 4/1973 | Germany | 104/148 LM |
| 2,329,560 | 12/1974 | Germany | 104/148 MS |

Primary Examiner—Galen L. Barefoot
Attorney, Agent, or Firm—Wenderoth, Lind & Ponack

[57] ABSTRACT

A structural arrangement for carrying armature rails of an attraction type magnetically floated travelling body comprising a plurality of carrying blocks which are fixed to bases and are arranged with spacing in the longitudinal direction of rails; and an armature rail which is carried along the side of the bases by the carrying blocks, said armature rail being provided with a groove and a flange formed on one side thereof confronting the carrying block, each carrying block being provided with a groove which engages with the tip of the flange of the armature rail and with an extruding arm which engages with the groove provided in the armature rail, the structural arrangement further including a tightening device for connecting each armature rail to each carrying block by tightening the engagement of the flange of the rail with the block and the engagement of the extruding arm of the block with the groove of the rail respectively.

6 Claims, 9 Drawing Figures

ARMATURE RAILS AND RAIL CARRYING ARRANGEMENT FOR ATTRACTION TYPE MAGNETICALLY FLOATED TRAVELLING BODY

BACKGROUND OF THE INVENTION

1. Field of the Invention

This invention relates to an attraction-type magnetically floated travelling body and more particularly to a structural arrangement for supporting or carrying armature rails employed therein having an inverted U-shape sectional shape.

2. Description of the Prior Art

In the conventional travelling body of this type, such armature rails are arranged in relation to the travelling body, in such a manner as illustrated by example in FIG. 1 of the accompanying drawings. Referring to FIG. 1, each of the left and right armature rails 3 are mounted through a carrying block 2 on a base 1 which is positioned on the ground. On the other hand, beneath the floor of the travelling body 5 on the left and right hand sides thereof, a plurality of electromagnets 4, whose excitation windings thereof are omitted from the illustration for simplification are disposed in the longitudinal direction of the travelling body to confront the open ends of both sides of the armature rails 3 and to allow a control current flow in such a way as to keep the electromagnets away from the open ends with a preset spacing. With the travelling body made to be afloat in the air by the magnetic attracting force of the electromagnets in this manner, a driving means such as a linear motor causes the travelling body to travel along the armature rails 3 in a state of being afloat. In the conventional arrangement for carrying the armature rails of an inverted U-shape as represented in the above mentioned example, the exterior face of one leg portion of the inverted U-shape is secured by welding to supporting blocks provided on the ground side. With such arrangement employed, however, there arises distortion or strain in the welded parts of the armature rails. Furthermore, the expansion and contraction of the armature rails in its longitudinal direction due to the varying atmospheric temperature would result in the undesirable deformation in the layout of the rails which specifically require the precise installation for this kind of application. Besides, with the armature rails being fixed by welding, it is extremely difficult to make precise adjustment in order to obtain the necessary alignment.

SUMMARY OF THE INVENTION

It is a principal object of this invention to provide a structural arrangement which eliminates the above stated shortcomings of the structural arrangement conventionally employed for carrying armature rails. In accordance with this invention, armature rails which are formed into a unique shape are connected to carrying members by a pressure fastening means such as bolts or the like instead of fixing the rails by welding.

The features of the present invention lie in a structural arrangement for carrying armature rails of an attraction type magnetically floated travelling body comprising a plurality of carrying blocks which are fixed to bases and are arranged with spacing in the longitudinal direction of rails; and an armature rail which is carried along the side of the bases by the carrying blocks, said armature rail being provided with a groove and a flange formed on one side thereof confronting the carrying block, each carrying block being provided with a groove which engages with the tip of the flange of the armature rail and with an extruding arm which engages with the groove provided in the armature rail, the structural arrangement further including a tightening means for connecting each armature rail to each carrying block by tightening the engagement of the flange of the rail with the block and the engagement of the extruding arm of the block with the groove of the rail respectively.

The above and other objects, features and advantages of this invention will become apparent from the following detailed description of this invention taken in connection with the accompanying drawings.

DETAILED DESCRIPTION OF THE INVENTION

Figure 1:
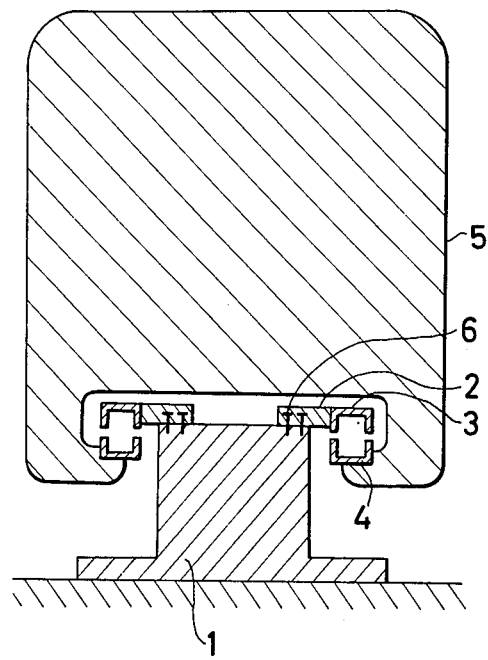
FIG. 1 is a sectional view illustrating, as mentioned in the foregoing, an example of the conventional attraction-type magnetically floated travelling body.
Figure 2:
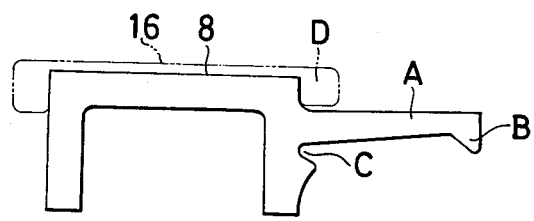
FIG. 2 is a sectional view illustrating the sectional shape of an armature rail formed in accordance with this invention.

Referring to the accompanying drawings, each component of the invented arrangement is described as follows:

In FIG. 2 which illustrates sectional shape of each armature rail, which is uniformly formed in the longitudinal direction thereof. In addition to the conventional inverted U-shape sectional form, the rail of this invention is provided with a horizontally extending arm portion flange A. At the tip of the arm A, there is provided a protrudent part B formed into an inverted triangular shape. The root portion of the arm A is formed into a S-shape to have a groove portion C. The rail is provided with a stepped portion D above the arm A for the purpose of making the armature rail usable also as a reaction plate of a single side type linear motor. Namely, in the case of a reaction plate of a composite secondary conductor type, the armature rail can be utilized as it is as a ferromagnetic plate with a nonmagnetic conductor plate used to cover it. In such a case, the stepped portion D of the armature rail enables to accommodate the conductor plate without causing its overhung portion to protrude from the upper part of the armature rail. The conductor plate mounting position is indicated by a two-dot chain line.

Figure 3:
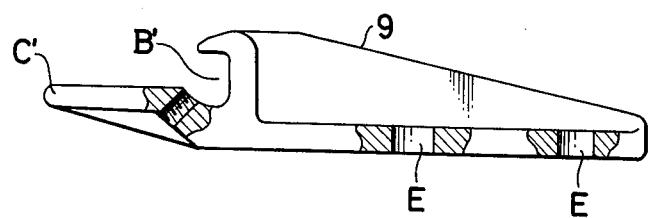
FIG. 3 is a side view illustrating a carrying block formed in accordance with this invention.

FIG. 3 is a side view illustrating the shape of a carrying block 9 formed in accordance with this invention. The carrying block 9 is provided with a groove portion B' which is arranged to hold therein the inverted triangular protrusion B of the above stated armature rail 8. The block 9 is provided also with a protrudent portion C' which is inserted in the groove portion C of the armature rail 8; screw holes for pressure fastening the protrusion B of the armature rail to a position in the obliquely upward direction; and also with slots E which are formed therein for mounting it on a base with bolts.

Figure 4:
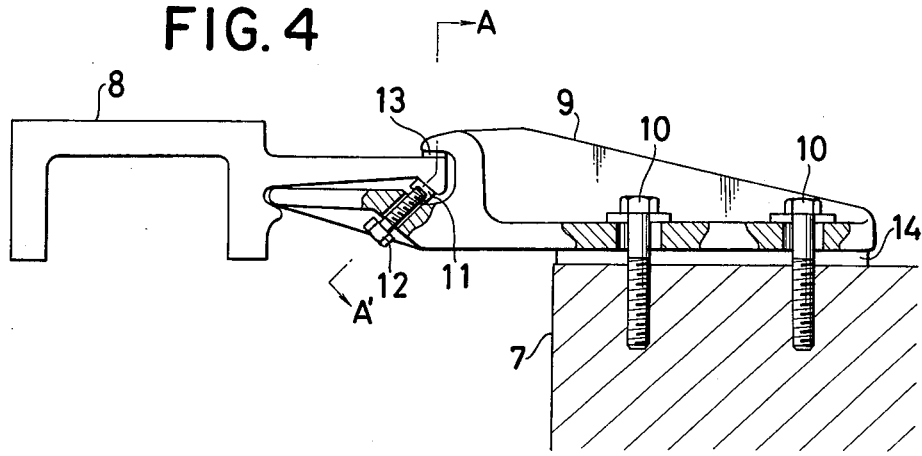
FIGS. 4 and 5 illustrate a method of connecting the carrying block to the armature rail and to a base in accordance with this invention.
Figure 5:
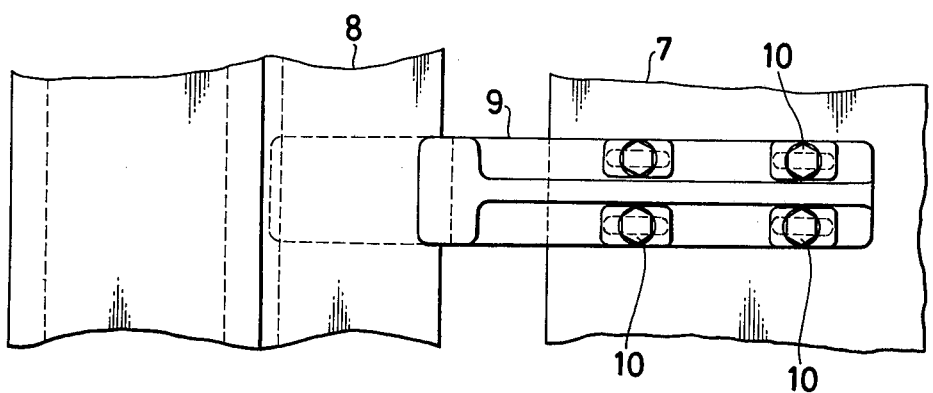
Figure 6:
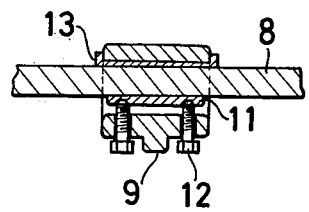
FIGS. 6, 7, 8 and 9 illustrate the details of a method of connecting the carrying block to the armature rail in accordance with this invention.
Figure 7:
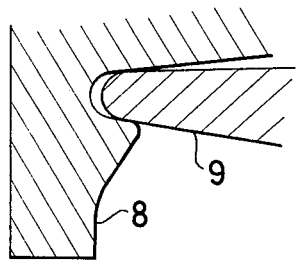
Figure 8:
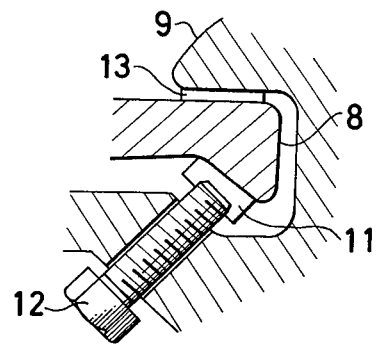

These components are assembled to function as follows: Referring to FIG. 4, a plurality of carrying blocks 9 are attached to the armature rail 8 one after another with a preset spacing in the longitudinal direction of the rail 8 with each of the blocks 9 secured to the base 1. Referring now to FIG. 8, when a bolt 12 is tightened, the tightening force which is transmitted through an adapter 11 pushes the inverted triangular protrusion of the rail 8 against the upper face of the groove portion of the carrying block 9 and, at the same time, causes the protrusion to be pulled to the right as viewed in the illustration of FIG. 8. On the other hand, the tip of the protrudent portion of the carrying block 9 is brought into the groove of the rail 8 to be pressure fastened to the groove and thus the rail 8 and the carrying block 9 are secured to each other. The advantages that can be brought about by the above described arrangement of this invention include:

1. With the armature rail not connected by welding, the joint part provides for sliding allowance for the expansion and contraction that take place along the longitudinal direction of the rail as the atmospheric temperature varies around the rail. This precludes the possibility of distortion of the rails due to the temperature variation.

2. Installation work and adjustment required for maintenance of precision can be easily carried out. The twisting of the rail can be adjusted by changing the thickness of a shim 13. Adjustment of position in the horizontal direction can be made through the slots which are provided for mounting to the base 1 with bolts. The position adjustment in the vertical direction can be readily accomplished by changing the thickness of a spacer 14.

3. With the rail installed without welding, strain that otherwise tends to results from such welding is eliminated.

Figure 9:
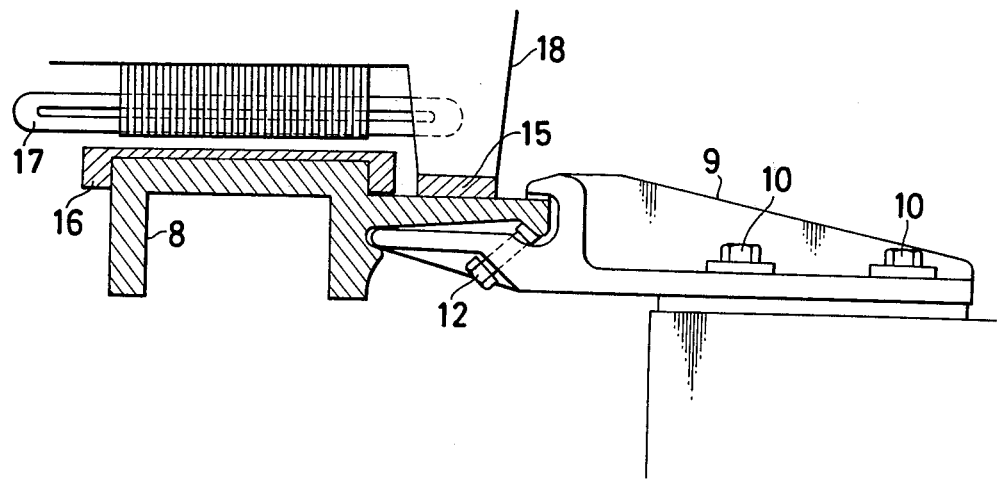

4. Referring to FIG. 9, where the upper surface of the armature rail 8 is utilized also as a reaction plate of a composite secondary conductor type for a linear motor as illustrated in FIG. 9, the upper face of the arm extending from the armature rail 8 serves as a skidding face when the buoyant force of the travelling body is lost in high speed travelling or in similar cases.

In FIG. 9, a reference numeral 15 indicates a skid; 16 indicates a nonmagnetic conductor plate for a composite secondary conductor; 17 indicates a linear motor winding; and 18 indicates a travelling body.

As understood from the above descriptions, the present invention is very advantageous over the prior art in that the armature rail can be arranged in a high degree of precision and, this high degree of precision can be maintained after the construction because elongation or contraction due to the ambient temperature changes can be absorbed satisfactorily.

What is claimed is:

1. A structural arrangement for carrying armature rails of an attraction type magnetically floated travelling body comprising a plurality of carrying blocks which are fixed to bases and are arranged with spacing in the longitudinal direction of said rails; and an armature rail which is carried along the side of the bases by the carrying blocks, said armature rail being provided with a groove and a flange formed on one side thereof confronting the carrying block, each carrying block being provided with a groove which engages with the tip of the flange of the armature rail and with an extruding arm which engages with the groove provided in the armature rail, the structural arrangement further including a tightening means for connecting each armature rail to each carrying block by tightening the engagement of the flange of the rail with the block and the engagement of the extruding arm of the block with the groove of the rail respectively.

2. A structural arrangement for carrying armature rails as defined in claim 1, wherein said flange of the armature rail is disposed above said extruding arm of the carrying block.

3. A structural arrangement for carrying armature rails as defined in claim 2, wherein the upper surface of said flange of the armature rail is utilized as a braking face for allowing a friction material which is attached to the bottom of said travelling body to skid thereon.

4. A structural arrangement for carrying armature rails as defined in claim 1, wherein the tip of said flange of the armature rail is loosely fitted in the groove of said carrying block and then is set into a precise position therein before it is secured thereto by said tightening means, said tightening means comprises a bolt which is screwed into said carrying block.

5. A structural arrangement as defined in claim 1, wherein between the tip of said flange and the groove which are in engagement with each other, there is provided a shim which permits adjustment of the spacing between said flange and said groove.

6. A structural arrangement as defined in claim 1, wherein the upper surface of said flange is arranged to be lower than the upper surface of said armature rail.

* * * * *